United States Patent

Bates et al.

[11] Patent Number: 5,318,142
[45] Date of Patent: Jun. 7, 1994

[54] HYBRID DRIVE SYSTEM

[75] Inventors: Bradford Bates, Ann Arbor; Ronald I. Sims, Saline; Rodney J. Tabaczynski, Northville, all of Mich.

[73] Assignee: Ford Motor Company, Dearborn, Mich.

[21] Appl. No.: 971,740

[22] Filed: Nov. 5, 1992

[51] Int. Cl.⁵ .................... B60K 1/04; B60K 6/04
[52] U.S. Cl. .................... 180/65.2; 180/65.3; 364/424.01
[58] Field of Search ............ 180/65.2, 65.3, 65.4, 180/65.8; 364/424.01, 424.05

[56] References Cited

U.S. PATENT DOCUMENTS

| | | |
|---|---|---|
| 3,543,873 | 12/1970 | Toy .................... 180/65.2 |
| 3,732,751 | 5/1973 | Berman et al. . |
| 3,771,821 | 11/1973 | Rist et al. . |
| 3,791,473 | 2/1974 | Rosen . |
| 3,888,325 | 6/1975 | Reinbeck . |
| 3,923,115 | 12/1975 | Helling . |
| 4,042,056 | 8/1977 | Horwinski .................... 180/65.2 |
| 4,165,795 | 8/1979 | Lynch et al. . |
| 4,305,254 | 12/1981 | Kawakatsu et al. . |
| 4,306,156 | 12/1981 | Monaco et al. . |
| 4,335,429 | 6/1982 | Kawakatsu . |
| 4,400,997 | 8/1983 | Fiala . |
| 4,405,891 | 9/1983 | Galloway .................... 180/65.2 X |
| 4,423,794 | 1/1984 | Beck .................... 180/65.2 X |
| 4,438,342 | 3/1984 | Kenyon . |
| 4,470,476 | 9/1984 | Hunt .................... 180/65.2 |
| 4,533,011 | 8/1985 | Heidemeyer et al. .................... 180/65.2 |

FOREIGN PATENT DOCUMENTS

| | | | |
|---|---|---|---|
| 2225081 | 1/1974 | Fed. Rep. of Germany | ..... 180/65.3 |
| 3523325 | 1/1987 | Fed. Rep. of Germany | ..... 180/65.3 |
| 3842632 | 6/1990 | Fed. Rep. of Germany | ..... 180/65.2 |
| 2419832 | 11/1979 | France | .................... 180/65.2 |
| 1425108 | 9/1988 | U.S.S.R. | .................... 180/65.2 |

OTHER PUBLICATIONS

"Sodium/Sulfur Batteries Advanced Battery Concept", U.S. Department of Energy, Office of Energy Storage and Distribution, Sep. 1988.

*Primary Examiner*—Brian L. Johnson
*Attorney, Agent, or Firm*—Roger L. May; Damian Porcari

[57] ABSTRACT

A hybrid drive system for use in an electric vehicle comprising an electric motor generator for moving the vehicle, plural electrical energy sources in electric contact with electric motor/generator and a control source in electrical contact with the plural electrical energy sources include a variable-rate energy storage system, a low-rate energy storage system and a high-rate energy storage system. In operation, the control source determines the average power consumption of the vehicle during emission operation throughout its ongoing duty cycle and controls the extent to which each of the energy sources energizes the electric motor/generator to move the vehicle, such that the vehicle may be efficiently operated in both emission and non-emission modes in accordance with environmental restrictions and operator-imposed power demands.

16 Claims, 2 Drawing Sheets

HYBRID DRIVE SYSTEM

TECHNICAL FIELD

This invention relates generally to electric vehicles and, more particularly, to a hybrid drive system and method of selectively energizing an electric motor/generator to efficiently move the vehicle during emission and non-emission operation.

BACKGROUND OF THE INVENTION

Since the turn of this century, the automotive industry has allocated limited funds for the research and development of alternative power sources, including electric vehicles. These efforts have proven unsuccessful, however, due to technical and economic obstacles.

On the technical side, those skilled in the art will recognize that conventional electric vehicles have historically suffered from the inability to meet performance and range requirements necessary for practical use. For example, it is well known that significant pulse power is required to meet vehicle acceleration requirements during peak power demands. In order to meet these power demands, battery designers have been forced to trade-off battery specific energy (energy per unit weight) and power density (power per unit volume). As a result, larger and heavier batteries have been utilized which have decreased efficiency, performance and aesthetic appeal. These design problems coupled with the availability of inexpensive imported fossil fuels have heretofore impeded large-scale commercial development and implementation of electric vehicles.

Recent changes, however, in global politics and legislation mandating reduced emission automobiles have now fueled renewed interest in the development of electric and hybrid internal combustion engine/electric vehicles which are "environmentally safe". See for example, U.S. Pat. No. 4,165,795 to Lynch et al. which discloses a parallel hybrid drive system for self propelled vehicles having a drive shaft in common with an internal combustion engine leading to a variable speed transmission and a final drive train.

Similarly, U.S. Pat. No. 3,923,115 issued to Helling discloses a parallel hybrid drive for use in a vehicle having at least two motors, one of which is an electric motor. Helling further discloses the an electric accumulator for use in cooperation with a gyro-accumulator drive (flywheel) in a 3-shaft configuration with multiple differentials and speed matching capability for storing kinetic energy during braking.

U.S. Pat. No. 4,438,342 issued to Kenyon discloses a hybrid electrical-heat engine vehicle and alternator which is totally free of elemental iron in its magnetic circuit. As disclosed, the rectified output of the alternator can be provided in series with a battery pack powering an electric drive motor so as to give a surge of mechanical power without magnetic saturation loss.

U.S. Pat. No. 4,305,254 issued to Kawakatsu et al. discloses a control apparatus for a hybrid vehicle comprising an internal combustion engine (ICE) and a motor/generator energized by a battery. As more fully disclosed in Kawakatsu, the ICE is designed to run only in a predetermined region of better fuel consumption and torque range. Outside this region, the motor is mainly used as a prime mover.

Finally U.S. Pat. No. 3,791,473 issued to Rosen discloses a hybrid power train which includes a heat engine operating as a prime mover in cooperation with a secondary electromechanical system such as a battery energized electric motor. As disclosed by Rosen, the heat engine is a quasi-constant torque device which can be varied in response to the state of charge of the battery or in response to operator imposed torque demands in excess of certain predetermined amounts. The power train further includes a mechanical accelerator for controlling the instantaneous torque output of the combined heat engine/electric motor.

The prior art systems discussed above provide a general background in respect of the design and application of hybrid drive systems in electric vehicles. Although these systems generally have increased range and acceleration capabilities due to improved materials and battery designs, they still suffer from design and operational restraints reminiscent of predecessor electric vehicles. More specifically, the prior art hybrid systems still require significant secondary power capability to meet acceleration and extended range requirements. These deficiencies are compounded further in situations where the vehicles are required to operate in pure EV (non-emission) modes as will soon be required in California and several other states which have adopted similar zero emission plans.

SUMMARY OF THE INVENTION

It is an object of the present invention to overcome the problems of the prior art drive systems by providing a hybrid drive capable of meeting the performance, acceleration and range requirements of hybrid electric vehicles necessary for efficient operation in both emission and pure EV (non-emission) modes.

Accordingly, a general object of the present invention is the provision of a hybrid drive system having plural electrical energy source means for use in cooperation with an electric motor/generator means for moving a hybrid electric vehicle.

In carrying out the above object, the drive system of the present invention comprises primary energy source means having a low-rate energy storage system, secondary energy source means having a variable-rate energy storage system and supplemental energy source means having a high-rate energy storage system. The primary, secondary and supplemental energy source means are in electrical contact with an electric motor/generator for selectively energizing the electric motor/generator to move the vehicle.

The system components of the present invention are regulated by control means for determining the extent to which the respective energy storage systems energize the electric motor/generator in accordance with environmental restrictions and performance demands imposed on the vehicle. The control means further regulates the extent to which the electric motor/generator and/or the secondary energy source means recharges the low-rate and high-rate energy storage systems.

For example, where regenerative brake means are included, the control means operates to regulate the extent to which the low-rate and high-rate energy storage systems are recharged by the electric motor/generator during braking. Similarly, where emission operation is permitted, the control means operates to regulate the extent to which the secondary energy source recharges the low-rate and high-rate energy storage systems.

As disclosed herein, the variable-rate energy storage system of the present invention comprises, for example, a combustion engine or heat engine and alternator for converting chemical energy to electrical energy. Similarly, the low-rate energy storage system comprises, for example, a traction battery for converting chemical energy to electrical energy. The high-rate energy storage system comprises a super capacitor or power maximized battery capable of storing electrical energy in the form of electrostatic or ionic charge and supplying the same to the electric vehicle.

The primary energy source means provides primary power to the vehicle during both emission and pure EV modes of operation. In contrast, the secondary energy source means acts as a range extender when emission operation is permitted. Finally, the supplemental energy source means provides supplemental power to the electric vehicle necessary to meet peak power demands.

A more specific object of the present invention is thus the provision of an improved series hybrid drive system for use in a hybrid electric vehicle having regenerative brake means operative by an electric motor/generator. The drive system includes primary, secondary and supplemental energy sources having respective low-rate, variable-rate and high-rate energy storage systems for selectively energizing the electric motor/generator in cooperation with a microcontroller.

As further disclosed herein, the microcontroller also regulates the extent to which the low-rate and high-rate energy storage systems are recharged by the electric motor/generator through regenerative braking. During emission modes, the microcontroller continuously measures the rate of energy consumption of the vehicle throughout the vehicle's duty cycle. This information is used to determine the average power consumption of the vehicle and coordinate the secondary energy source to supply the requisite power to the vehicle. The microcontroller also regulates the extent to which the secondary energy source recharges the low-rate and high-rate energy storage systems when the average power consumption of the vehicle falls below the constant energy output of the secondary energy source.

Accordingly, another more specific object of the present invention is the provision of a method for determining the rate of energy consumption of an electric vehicle equipped with the a hybrid drive system of the present invention and regulating the energy output of the secondary energy source means to provide the required average power for extended operation of the electric vehicle.

Still further, another more specific object of the present invention is the provision of a method for determining the average power consumption and the actual power demand of an electric vehicle over predetermined duty cycles during emission operation. This information is used by the control means to set the constant energy output of the secondary power source and to further determine the power differential between the average power consumption of the vehicle as determined in the preceding part of the duty cycle and the actual power demand of the vehicle. Once the power differential is determined, the low-rate and high-rate energy storage systems are selectively enabled and disabled to provide the requisite energy to the motor/generator means to meet the actual power demand of the vehicle. Low-rate and high-rate energy storage systems are also recharged during emission operation in cooperation with the control means when the actual power demand of the vehicle falls below the average power consumption as detected in the previous duty cycle.

The objects, features and advantages of the present invention are readily apparent from the following detailed description of the best mode for carrying out the invention taken in connection with the accompanying drawings.

DESCRIPTION OF THE PREFERRED EMBODIMENT

Figure 1:
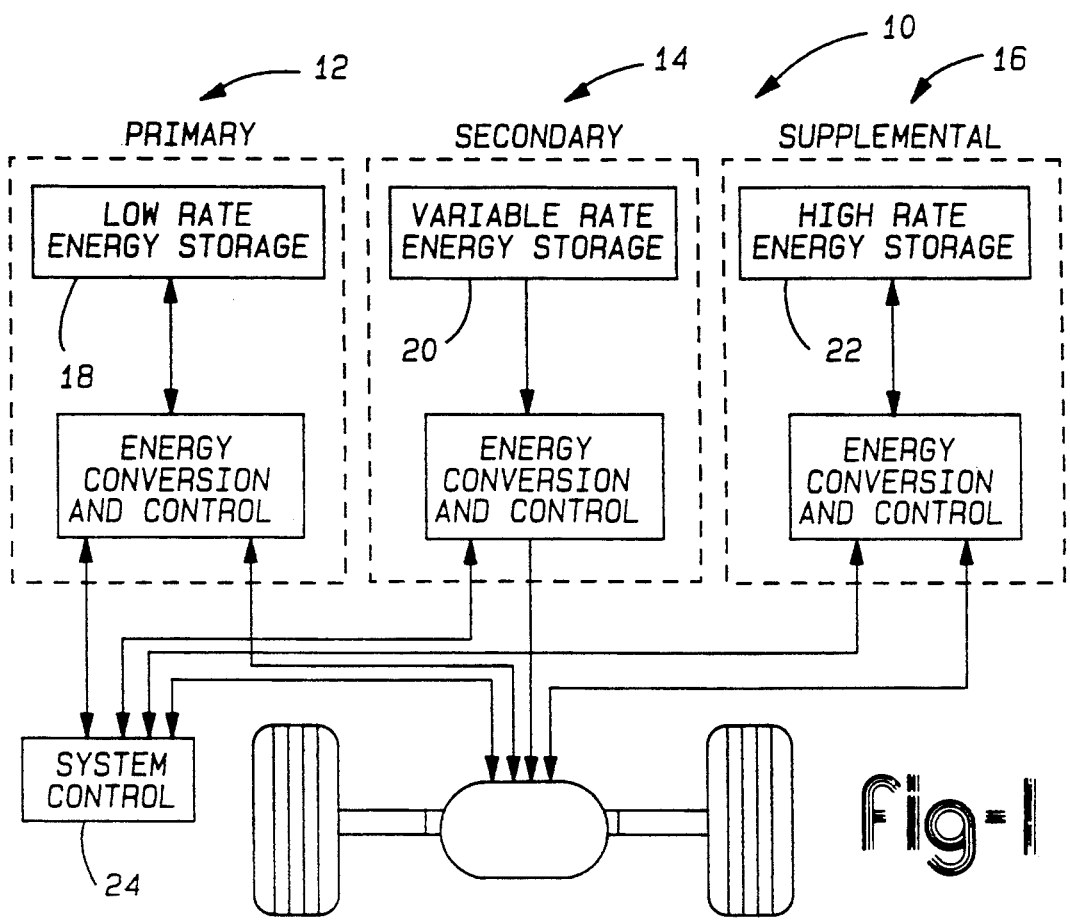
FIG. 1 is an operational block diagram of the hybrid drive system of the present invention.

With reference to FIG. 1 of the drawings, there is shown an operational block diagram of the hybrid drive system is of the present invention indicated generally by reference numeral 10. Drive system 10 includes plural electrical energy sources for selectively powering an electric vehicle. These plural electrical energy sources include primary energy source means 12, secondary energy source means 14 and supplemental energy source means 16.

As indicated in FIG. 1, primary energy source means 12 includes a low-rate energy storage system 18. Similarly, secondary energy source means 14 includes a variable-rate energy storage system 20. Supplemental energy source means 16 includes a high-rate energy storage system 22. Also included for use in cooperation with the primary, secondary and supplemental energy source means 12, 14 and 16 is control means 24 for determining the extent to which each of the storage systems 12, 14 and 16 energize the electric vehicle.

Figure 2:
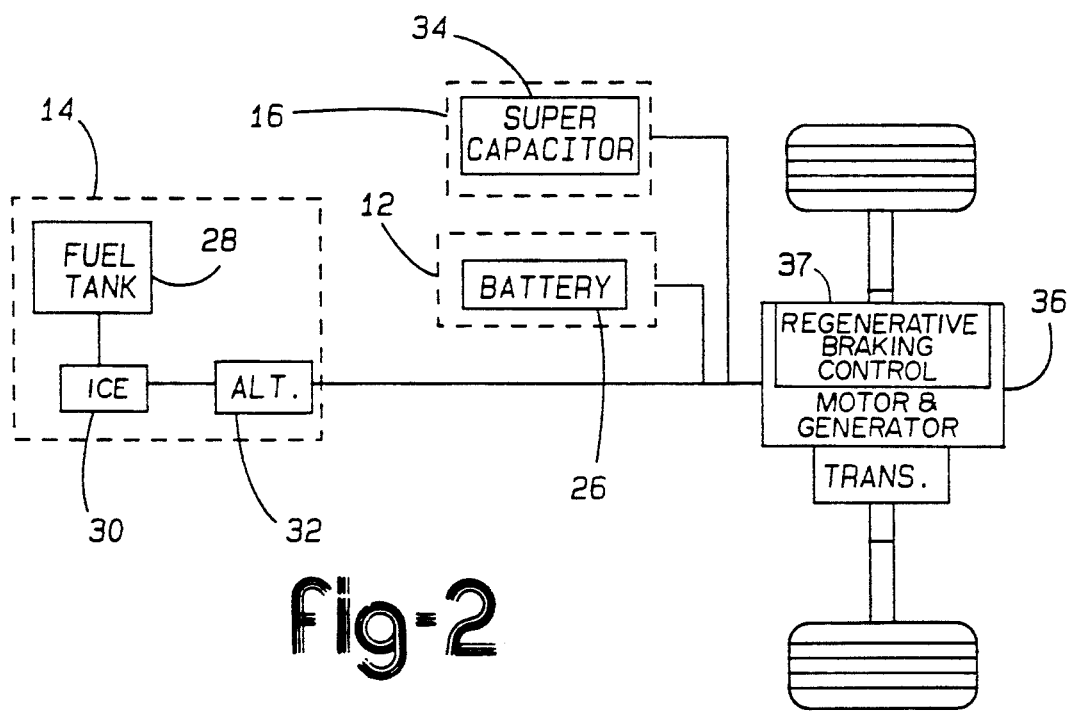
FIG. 2 is a schematic diagram of the hybrid drive system and system components of the present invention.

Referring now to FIG. 2, the system components of the series hybrid drive system of the present invention are shown in further detail. Primary energy source means 12, for example, is shown including, for example, a traction battery 26 as a low-rate energy storage system traction battery 26 is a high energy/low power device. Similarly, secondary energy source means 14 is shown including, for example, a fuel tank 28, internal combustion engine (ICE) 30 and alternator 32 as a variable-rate energy storage system. This storage system is termed "variable" in view of its ability to provide high energy at a variable-rate.

It should be recognized that secondary energy source means 14 is principally designed, to operate as a range extender when emission operation is permitted. The disclosed fuel tank/ICE design is thus ideal because of its relatively low mass and low volume which provides maximum energy output. Applicants recognize, however, that any variable-rate energy storage system suitable to drive an alternator or generate energy directly may be utilized, including liquid fuel operated internal combustion engines, gas turbines, natural gas-operated engines, and similar heat and/or thermal engines which may utilize methane, methanol, propane, ethane or other chemical propellants, as well as fuel cells that may convert energy directly.

In view of the foregoing, proper consideration must be given to energy output, mass, volume and recharge time factors when selecting an appropriate secondary energy source for use in accordance with the series hybrid drive of the present invention. For example, traction batteries which have high mass, high volume and long charge time are generally unsuitable for use as secondary energy sources in the present invention.

Referring still to FIGS. 1 and 2, supplemental energy source means 16 is shown including a high-rate energy storage system 22 which may comprise, for example, a super capacitor or ultra capacitor 34 for storing electrical energy in the form of an electrostatic or ionic charge and supplying the same to the vehicle at a high-rate of energy transfer. Super capacitor 34 is preferably an electrolytic or electrochemical capacitor having a low self discharge rate. Super capacitor 34 is thus a high power/low energy device. Applicants recognize, however, that other high power/low energy electrical storage devices may be used, including, for example, power maximized batteries.

As seen in FIG. 2, secondary energy source means 14 and thus variable-rate energy storage system 20 is in electrical contact with the electric motor/generator 36. Primary energy source means 12 and low-rate energy storage system 18 are also in electrical contact with the electric motor/generator 36. Finally, supplemental energy source means 16 and high-rate energy storage system 22 are provided in parallel electrical contact with primary energy source means 12 and low-rate energy storage system 18.

The hybrid drive system of the present invention further includes regenerative brake means 37 operative by electric motor/generator 36 in cooperation with control means 24 and specified software to recharge the high-rate and low-rate energy storage systems 18 and 22. Plural electrical energy source means 12, 14 and 16 are further adapted to selectively energize the electric motor/generator 36 to move the vehicle.

Control means 24, shown in FIG. 1, is provided in electrical contact with primary, secondary and supplemental energy source means 12, 14 and 16, respectively to control the rate and amount of energy conversion of each energy source in accordance with legislative and operator imposed environmental restrictions and performance demands. Control means 24 may include, for example, a microcontroller or similar electronic or electromechanical device capable of implementing selective combinations and operational levels of plural electrical energy sources, 12, 14 and 16.

It is readily seen that the hybrid drive system discussed above is of the "series" configuration in that the plural energy sources 12, 14 and 16 focus on producing electrical energy as the final drive component, i.e., only the electric motor/generator means 36 produces torque. It should be recognized, however, that the disclosed use of plural electrical energy source means may be readily adapted by those skilled in the art to a parallel configuration wherein tractive energy may be supplied directly to the wheels in mechanical form from valuable rate energy source means 14 as well as electrical energy from primary and supplemental energy source means 12 and 16.

Operation

Figure 3:
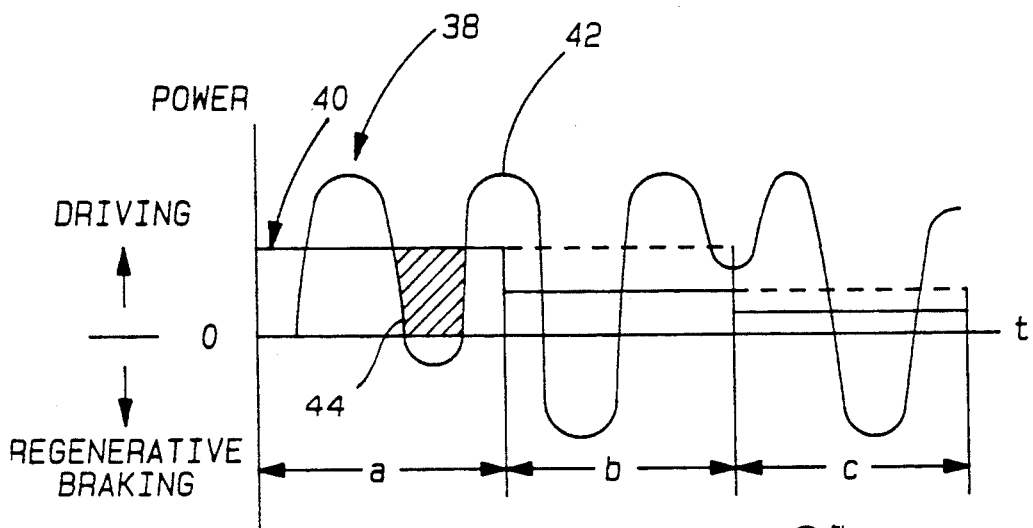
FIG. 3 is a schematic diagram of the representative power which may be input to the motor invertor set of an electric vehicle equipped with the series hybrid drive system of the present invention.
Figure 4:
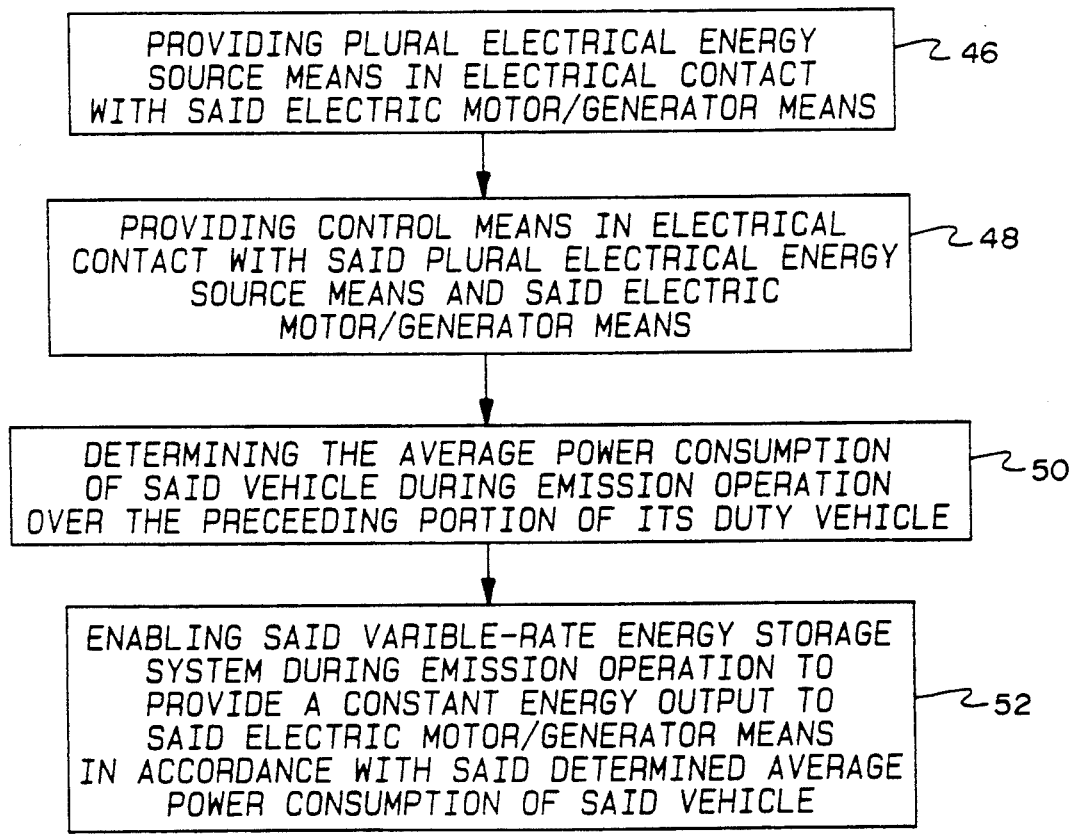
FIG. 4 is a block diagram of the method steps of the present invention.

With reference to FIGS. 3 and 4, the operation of the series hybrid drive system of the present invention will now be described in further detail.

As referenced above, control means 24 is designed to selectively enable and disable the respective power source means 12, 14 and 16, as may be required to efficiently operate the electric vehicle during emission and pure electric modes of vehicle operation. Control means 24 also monitors and coordinates the extent to which the electric motor/generator 36 recharges the low-rate and high-rate energy storage systems 18 and 22 when the electric vehicle is equipped with regenerative braking. During emission mode, control means 24 also regulates the extent to which secondary energy source means 14 recharges the low-rate and high-rate energy storage systems 18 and 22.

When emission operation is permitted by applicable ordinance and user preference, control means 24 is designed to continuously measure the rate of energy consumption of the electric vehicle throughout the vehicle's duty cycle. This information is used to determine the average power consumption of the vehicle and coordinate the secondary energy source means 14 to supply the requisite average power to the vehicle at the required level. Secondary energy source means 14 therefore principally acts as a range extender by supplying the electric vehicle with a constant energy output equal to the average power consumption of the vehicle as determined in the preceding part of its duty cycle.

With reference to FIG. 3, there is shown a schematic diagram of the representative power which may be input to the dc link of a motor invertor set of an electric vehicle equipped with the hybrid drive system of the present invention. The waveform generally indicated by reference numeral 38 represents the actual power demand of the vehicle over a succession of control periods designated a, b, and c. It should be noted that due to the varying operating conditions of the vehicle, the actual power demand differs in each of the intervals a, b, and c. Thus, the determined average power consumption of the vehicle in control period "a", for example, becomes the control setting for the variable-rate energy source during the next succeeding control period "b", and so on. Still referring to FIG. 3, attention is directed to line 40 which indicates the average power consumption of the vehicle determined by control means 24 during one preceding control period. In order to meet peak power demands of the vehicle such as represented at point 42 on waveform 38, supplemental energy source means 16 and, more specifically, super capacitor 34 performs a load levelling function in cooperation with primary energy source means 12, and more specifically, traction battery 26 to provide the additional power required to meet the instantaneous power demand of the vehicle.

Those skilled in the art will recognize that the parallel configuration of primary energy source means 12, and traction battery 26 with supplemental energy source means 16 and super capacitor 34 results in a common voltage across the elements. The load leveling function referred to herein is therefore a function of the internal resistances of the low-rate and high-rate energy storage systems 12 and 16, respectively. Super capacitor 34, which is a low energy/high power device can thus be used to provide high power to the vehicle during peak power demands over short time intervals only. In contrast, traction battery 26 is a high energy/moderate power output device which is capable of providing a large amount of energy, yet moderate power over substantial time periods. Low-rate energy storage system 12 and, more specifically, traction battery 26 thus recharges high-rate energy storage system 16 and, more specifically, super capacitor 34 as the power capacity of super capacitor 34 diminishes or is exhausted.

Attention is also directed to the regulating function performed by control means 24 during emission operation. Specifically, it is recognized that during deceleration, the average power consumption of the vehicle may fall below the constant energy output of secondary energy source means 14 as determined by control means 24 during the preceding part of the vehicle's duty cycle. During this drop in power demand, as indicated on waveform 38 by reference numeral 44, excess energy will still be provided to the vehicle by secondary energy source means 14 until adjusted on the next control cycle. Control means 24 thus acts to regulate the extent to which this excess power is channeled to primary and supplemental energy source means 12 and 16 to recharge the low-rate and high-rate energy storage systems, 18 and 22, respectively.

When the electric vehicle is equipped with regenerative braking, the parallel configuration of low-rate and high-rate energy storage systems 12 and 16 also results in a load leveling function which, in cooperation with control means 24 is operative to recharge low-rate and high-rate energy storage systems 12 and 16, respectively.

With specific reference to FIG. 4 of the drawings, the method steps of the present invention may thus be simplified to the provision of plural electrical energy source means 12, 14 and 16 in electrical contact with electric motor/generator means 36 as shown in block 46. There is further provided control means 24 in electrical contact with plural electrical energy source means 12, 14 and 16 and said electrical motor/generator means 36 as shown in block 48. The average power consumption 40 of the vehicle during emission operation over the proceeding portion of its duty cycle may thus be determined as referenced in block 50. Once provided with this information, the variable-rate energy storage system 20 may be enabled during emission operation to provide a constant energy output to the electric motor/generator means 36 in accordance with a determined average power consumption 40 of the vehicle as referenced in block 52.

Applicant's invention described herein provides a multi-modal energy management system for transportation applications characterized by the need for short periods of high rates of energy transfer for rapid acceleration and deceleration, long periods of low rates of energy transfer for general operation and a need for rapid energy transfer to rejuvenate the energy storage combined with a low-rate of conversion of that energy on an average basis. The multiple energy storage and conversion/control devices disclosed herein are able to provide for these differing requirements and permit an optimization of the total system to achieve efficient operation with minimum emissions and without the sacrifice of high mass fractions of battery in order to satisfy peak power demands.

While the best mode for carrying out the invention has been described in detail, those familiar with the art to which this invention relates will recognize alternative designs and embodiments for practicing the invention as defined by the following claims.

We claim:

1. In an electric vehicle having an ongoing duty cycle, a hybrid drive system, comprising:
   electric motor/generator means for moving said vehicle;
   plural electrical energy source means in electrical contact with said electric motor/generator means, said plural electrical energy source means including a variable-rate energy storage system, a low-rate energy storage system and a high-rate energy storage system; and
   control means for determining the average power consumption of said vehicle during emission operation throughout said ongoing duty cycle and controlling the extent to which each of said energy source means energizes said electric motor/generator means to move said vehicle, said control means in electrical contact with said plural electrical energy means such that said vehicle may be efficiently operated in both emission and non-emission modes in accordance with environmental restrictions and operator imposed power demands.

2. A hybrid drive system as in claim 1, wherein said high-rate energy storage system is adapted to perform a load leveling function during emission operation in cooperation with said control means to recharge said low-rate and high-rate energy storage systems when the actual power demand of said vehicle is less than the average power consumption of said vehicle.

3. A hybrid drive system as in claim 1, further including regenerative brake means operative by said electric motor/generator means in cooperation with said control means for selectively recharging said low-rate and high-rate energy storage systems.

4. A hybrid drive system as in claim 3 wherein said high-rate energy storage system is in parallel electrical contact with said low-rate energy storage system and is further adapted to perform a load leveling function in cooperation with said motor/generator means to recharge said high-rate and low-rate energy storage systems.

5. A hybrid drive system as in claim 1, wherein said control means comprises a microcontroller.

6. A hybrid drive system as in claim 1 wherein said variable-rate energy storage system comprises an internal combustion engine and an alternator for generating electrical energy and supplying said energy to said vehicle at a variable-rate of energy transfer, said variable-rate energy storage system in electrical contact with said low-rate energy storage system.

7. A hybrid drive system as in claim 1, wherein said low-rate energy storage system comprises a traction battery for storing electric energy and supplying said electric energy to said vehicle at a low-rate of energy transfer.

8. A hybrid drive system as in claim 1, wherein said high-rate energy storage system comprises a supercapacitor for storing electrical energy and supplying said energy to said vehicle at a high-rate of energy transfer, said high-rate energy storage system is in electrical contact with said low-rate energy storage system and said electric motor/generator means.

9. A hybrid drive system as in claim 1 wherein said high-rate energy storage system comprises an electrochemical supercapacitor for storing electrical energy and providing said energy to said vehicle at a high-rate of energy transfer, said high-rate energy storage system in electrical contact with said low-rate energy storage system and said electric motor/generator means.

10. A hybrid drive system as in claim 1, wherein said high-rate energy storage system comprises a power maximized battery for storing electrical energy and supplying said energy to said vehicle at a high-rate of energy transfer, said high-rate energy storage system in electrical contact with said low-rate energy storage system and said electric motor/generator means.

11. In an electric vehicle having an ongoing duty cycle, a hybrid drive system, comprising:
  electric motor/generator means for moving said vehicle;
  primary energy source means in electrical contact with said electric motor/generator means for selectively energizing said electric motor/generator means, said primary energy source means including a low-rate energy storage system;
  secondary energy source means in electrical contact with said electric motor/generator means and said primary energy source means, said secondary energy source means including a variable-rate energy storage system for providing a constant energy output to said electric motor/generator means during emission operation in accordance with the average-rate of power consumption of said vehicle;
  supplemental energy source means in electrical contact with said electric motor/generator means and said primary energy source means for selectively energizing said electric motor/generator means, said supplemental energy source means including a high-rate energy storage system;
  control means for determining the average power consumption of said vehicle during emission operation throughout said ongoing duty cycle and controlling the extent to which each of said energy source means energizes said electric motor/generator means to move said vehicle, said control means in electrical contact with said primary, secondary and supplemental energy source means such that said vehicle may be efficiently operated in both emission and non-emission modes in accordance with environmental restrictions and operator imposed power demands.

12. A hybrid drive system as in claim 11, wherein said high-rate energy storage system is adapted to perform a load leveling function during emission operation in cooperation with said control means to recharge said low-rate and high-rate energy storage systems when the actual power demand of said vehicle is less than the average power consumption of said vehicle.

13. A hybrid drive system as in claim 11, further including regenerative brake means operative by said electric motor/generator means in cooperation with said control means for selectively recharging said low-rate and high-rate energy storage systems.

14. A hybrid drive system as in claim 11 wherein said high-rate energy storage system is in parallel electrical contact with said low-rate energy storage system and is further adapted to perform a load leveling function in cooperation with said motor/generator means to recharge said high-rate and low-rate energy storage systems.

15. A hybrid drive system as in claim 11, wherein said control means comprises a microcontroller.

16. In an electric vehicle having a hybrid drive system and electric motor/generator means, a method of selectively energizing said electric motor/generator means to efficiently move said vehicle during emission and non-emission operation in accordance with environmental restrictions and operator imposed power demands, comprising the steps of:
  providing plural electrical energy source means in electrical contact with said electric motor/generator means, said plural electrical energy source means including a variable-rate energy storage system, a low-rate energy storage system and a high-rate energy storage system;
  providing control means in electrical contact with said plural electrical energy source means and said electric motor/generator means;
  determining the average power consumption of said vehicle during emission operation; and
  enabling said variable-rate energy storage system during emission operation to provide a constant energy output to said electric motor/generator means in accordance with said determined average power consumption of said vehicle, and to recharge said low-rate and high-rate energy storage systems when the instantaneous power demand of said vehicle is less than said determined average power consumption, such that the peak power demands of said vehicle may be fairly satisfied by the high-rate and low-rate energy storage systems.

* * * * *

UNITED STATES PATENT AND TRADEMARK OFFICE
CERTIFICATE OF CORRECTION

PATENT NO.  : 5,318,142
DATED       : June 7, 1994
INVENTOR(S) : Bradford Bates et al It is certified that error appears in the above-indentified patent and that said Letters Patent is hereby corrected as shown below:

Cover Page of Patent, Column 1, "Inventors" should be:
  after "Northville," , add -- John R. Wallace, Ann Arbor--

Cover Page of Patent, Column 2, "Abstract":  After "sources in" delete "electric" and substitute --electrical--.

Signed and Sealed this

Twenty-ninth Day of November, 1994

Attest:

BRUCE LEHMAN

Attesting Officer  Commissioner of Patents and Trademarks